(12) United States Patent
Brettar et al.

(10) Patent No.: US 12,180,872 B2
(45) Date of Patent: Dec. 31, 2024

(54) DETERMINATION OF A SOLENOID INJECTOR COIL TEMPERATURE

(71) Applicant: VITESCO TECHNOLOGIES GMBH, Regensburg (DE)

(72) Inventors: Jonathan Brettar, Toulouse (FR); David Nunes De Almeida, Toulouse (FR); Florent Faramond, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 219 days.

(21) Appl. No.: 17/796,977

(22) PCT Filed: Feb. 3, 2021

(86) PCT No.: PCT/EP2021/052468
§ 371 (c)(1),
(2) Date: Aug. 2, 2022

(87) PCT Pub. No.: WO2021/156272
PCT Pub. Date: Aug. 12, 2021

(65) Prior Publication Data
US 2023/0056972 A1 Feb. 23, 2023

(30) Foreign Application Priority Data
Feb. 4, 2020 (FR) ........................................ 2001094

(51) Int. Cl.
*F01N 3/20* (2006.01)
*F01N 9/00* (2006.01)
(Continued)

(52) U.S. Cl.
CPC ............... *F01N 3/208* (2013.01); *G01K 7/36* (2013.01); *G01K 13/00* (2013.01); *F01N 9/005* (2013.01);
(Continued)

(58) Field of Classification Search
CPC combination set(s) only.
See application file for complete search history.

(56) References Cited

U.S. PATENT DOCUMENTS 9,188,043 B1 * 11/2015 Faied ...................... F01N 3/208
9,194,269 B2 11/2015 Axe et al.
(Continued)

FOREIGN PATENT DOCUMENTS

DE 102014209333 A1 11/2015
DE 10 2019 201 976 8/2019
(Continued)

OTHER PUBLICATIONS

International Search Report and Written Opinion for PCT/EP2021/052468, dated Mar. 10, 2021 (10 pages).
(Continued)

*Primary Examiner* — Binh Q Tran
(74) *Attorney, Agent, or Firm* — NIXON & VANDERHYE

(57) ABSTRACT

Disclosed is a method for determining a temperature of a solenoid injector including a coil and a needle when the solenoid injector is in a non-injection phase, the method being characterized in that it includes the following steps: powering the solenoid injector coil using an electric generator for a period of time tvoltage strictly shorter than a period of time tlim corresponding to a time for which the coil is under power causing the needle to open; measuring at least one value icoil of the current of the solenoid injector coil using a current measurement sensor when the coil is powered; and determining a temperature of the solenoid injector from the at least one value icoil of the current of the solenoid injector coil.

11 Claims, 2 Drawing Sheets

(51) Int. Cl.
  *F01N 11/00* (2006.01)
  *F02D 41/20* (2006.01)
  *G01K 7/36* (2006.01)
  *G01K 13/00* (2021.01)

(52) U.S. Cl.
  CPC ......... *F01N 11/002* (2013.01); *F01N 2610/02* (2013.01); *F01N 2610/10* (2013.01); *F01N 2610/1453* (2013.01); *F01N 2900/1811* (2013.01); *F01N 2900/1821* (2013.01); *F02D 41/20* (2013.01); *F02D 2041/2027* (2013.01); *F02D 2041/2048* (2013.01); *F02D 2041/2051* (2013.01); *G01K 2217/00* (2013.01)

(56) References Cited

U.S. PATENT DOCUMENTS

| | | | |
|---|---|---|---|
| 9,458,748 B2 | 10/2016 | David et al. | |
| 10,711,675 B2 | 7/2020 | Sykes et al. | |
| 10,859,446 B2 | 12/2020 | Barbier et al. | |
| 11,131,228 B2* | 9/2021 | Barbier | F01N 3/2066 |
| 2009/0159047 A1* | 6/2009 | Eto | F02D 41/20 |
| | | | 123/435 |
| 2011/0276252 A1* | 11/2011 | Kabasin | F02M 53/06 |
| | | | 374/141 |
| 2012/0255282 A1* | 10/2012 | Nagata | F01N 3/208 |
| | | | 60/287 |
| 2015/0034167 A1* | 2/2015 | David | G01K 15/005 |
| | | | 702/133 |
| 2015/0267664 A1 | 9/2015 | Namuduri et al. | |
| 2015/0308314 A1 | 10/2015 | Axe et al. | |
| 2017/0101913 A1* | 4/2017 | Zapf | F01N 3/28 |
| 2018/0209373 A1* | 7/2018 | Yoshiume | F02D 41/0255 |
| 2019/0128165 A1 | 5/2019 | Sundararajan et al. | |

FOREIGN PATENT DOCUMENTS

| | | |
|---|---|---|
| EP | 2116709 A1 | 11/2009 |
| GB | 2 517 141 | 2/2015 |
| JP | 2019148252 A | 9/2019 |
| WO | 2015/164446 | 10/2015 |
| WO | 2016/206810 | 12/2016 |

OTHER PUBLICATIONS

Office Action, issued in Chinese Patent Application No. 202180012490.5 dated Oct. 26, 2023.

* cited by examiner

DETERMINATION OF A SOLENOID INJECTOR COIL TEMPERATURE

This application is the U.S. national phase of International Application No. PCT/EP2021/052468 filed Feb. 3, 2021 which designated the U.S. and claims priority to FR 2001094 filed Feb. 4, 2020, the entire contents of each of which are hereby incorporated by reference.

TECHNICAL FIELD

The present invention relates to controlling a solenoid injector and more particularly to determining the temperature of the solenoid injector in the non-injection phase. This invention was conceived for the technical field of internal combustion engines but could also apply to other technical fields implementing this type of injector.

PRIOR ART

A solenoid injector is an injector controlled by an electromagnet. Supplied with an electric current, the electromagnet controls the opening and closing of a needle, thus allowing the injection of a determined amount of a substance for various applications.

For example, urea solenoid injectors are used in selective catalytic reduction (SCR) systems found in vehicle exhaust lines in order to reduce nitrogen oxide (NOx) emissions by injecting urea into the exhaust gases.

The temperature of the solenoid injector has a significant impact on the injection of the substance that it delivers. In particular, precise measurement of the temperature of the solenoid injector makes it possible to control the amount injected more reliably. Specifically, the amount injected is directly dependent on the temperature of the solenoid injector since the latter acts on the viscosity of the substance. For example, in the case of urea, one and the same electrical command for controlling the solenoid injector for two different temperatures does not provide the same amount of urea injected into the selective catalytic reduction system.

In addition, exposing a solenoid injector to too high a temperature may lead to mechanical malfunctions. In a specific case, when the temperature of the solenoid injector containing urea reaches a certain threshold, the urea crystallizes and this crystallization may result in the injector becoming clogged.

There are two main methods in the literature for determining the temperature of a solenoid injector. A first method envisages measuring the temperature of an injector in the injection phase, that is to say when the injector receives an injection request command causing its needle to open. The second method corresponds to measuring the temperature the rest of the time, i.e. while the injector is not in the injection phase, when its needle is closed. This other phase will be referred to as the non-injection phase hereinafter.

During the injection phase, the temperature is determined based on the current flowing through the coil of the solenoid injector. The current induced in the coil makes it possible to calculate a resistance from which a temperature of the injector is determined.

However, during the non-injection phase, thermal models are applied to determine the temperature of the solenoid injector. These models are difficult to calculate since they depend on parameters independent of the solenoid injector and in particular on parameters specific to the system in which the injector is embedded. The models thus described by the literature are complex in terms of modeling and above all cannot be extrapolated outside of the system for which they are applied.

SUMMARY OF THE INVENTION

The object of the invention is therefore to overcome, at least in part, the problems set out above and to propose a method for determining a temperature of a solenoid injector when the latter is in the non-injection phase which provides a temperature estimate that is reliable and independent of the system in which the injector is embedded. Additionally, the invention also proposes a system for determining a temperature of a solenoid injector for implementing the method.

In this regard, one subject of the invention is a method for determining a temperature of a solenoid injector comprising a coil and a needle when the solenoid injector is in a non-injection phase, said method being characterized in that it comprises the following steps:

powering the solenoid injector coil using an electric generator for a period of time $t_{voltage}$ strictly shorter than a period of time $t_{lim}$ corresponding to a time for which the coil is under power causing the needle to open, measuring at least one value $i_{coil}$ of the current of the solenoid injector coil using a current measurement sensor when the coil is powered, determining a temperature of the solenoid injector from the at least one value $i_{coil}$ of the current of the solenoid injector coil.

The method thus makes it possible to avoid creating complex temperature calculation models that are dependent not only on the injector but also on the system in which it is integrated. It simply uses an already-known injection-phase method with the addition of interrupting the supply of power to the coil before opening the needle. Thus, the method may be implemented with ease in any system without requiring the integration of new components. In addition, the temperature measurement is at least as reliable as in the models proposed by the prior art.

In one embodiment, the computer determines a period of time $t_{lim}$ by analyzing the current signal $i_{coil}$ flowing through the coil of the solenoid injector when the injector is in the injection phase.

Specifically, when the needle opens, the coil current signal experiences a detectable disturbance which indicates the start of injection to the computer.

In one embodiment, the period of time $t_{lim}$ is determined by the computer during the injection phase directly preceding the non-injection phase during which the system implements the method.

Therefore, the period of time $t_{lim}$ takes into account the most recent parameters of the solenoid injector and of the system incorporating it.

According to one embodiment, the at least one current value allowing a temperature of the solenoid injector to be determined is measured over a period of time strictly shorter than $0.95 \times t_{lim}$. This is a safety mechanism to avoid triggering an injection.

The invention further proposes a system for determining the temperature of a solenoid injector, the solenoid injector comprising a coil and a needle, the system comprising a computer with a memory, an electric generator, and a current measurement sensor, characterized in that the computer is suitable for implementing each step of the method according to one of the embodiments presented above.

Furthermore, this system may be integrated into a vehicle equipped with a selective catalytic reduction (SCR) system, the SCR comprising a urea injection device having at least one solenoid injector. The invention thus makes it possible to determine the temperature of a urea injector in the non-injection phase in a vehicle.

Lastly, the invention takes the form of a computer program product comprising code instructions for implementing the method according to any one of the above embodiments, when it is implemented by a computer.

BRIEF DESCRIPTION OF THE DRAWINGS

Other features, details and advantages will become apparent from reading the following detailed description and from examining the appended drawings, in which.

DESCRIPTION OF THE EMBODIMENTS

Figure 1:
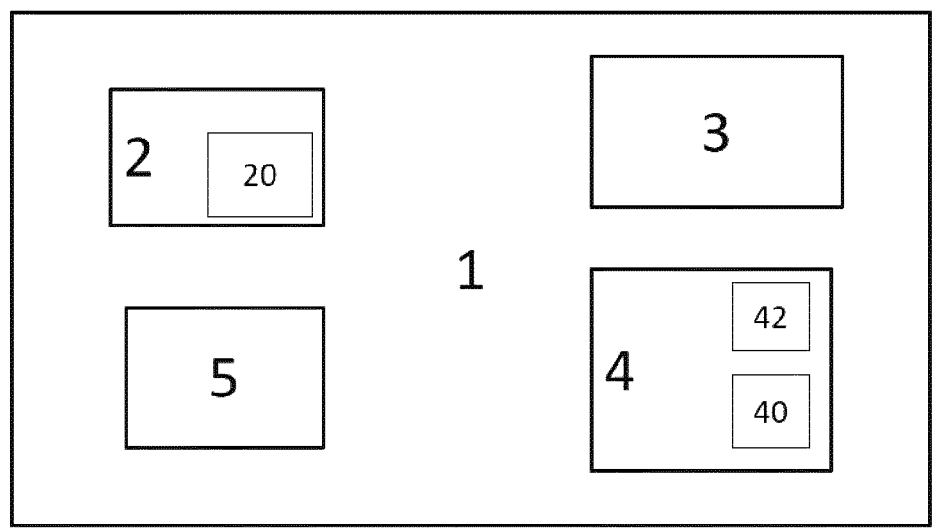
FIG. 1 presents a system for determining the temperature of a solenoid injector according to one embodiment.
Figure 2:
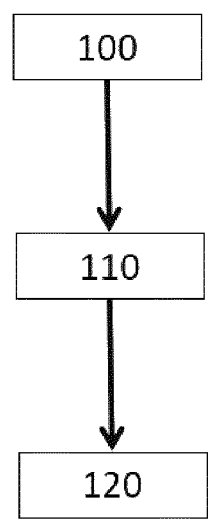
FIG. 2 presents a method for determining the temperature of a solenoid injector according to one embodiment.

Reference is now made to FIG. 1 and to FIG. 2 which show, respectively, a system for determining the temperature of a solenoid injector and the method associated therewith.

The method is implemented by a system 1 comprising a computer 2 with a memory 20. The computer 2 may, for example, be a processor, a microprocessor or a microcontroller. The memory 20 comprises code instructions executed by the computer 2. The system 1 also comprises a solenoid injector 4 comprising a coil 40 and a needle 42. Lastly, the system 1 comprises an electric generator 3 and a current measurement sensor 5. The electric generator 3 may, for example, be a low-voltage generator (LVG).

The system 1 as described above makes it possible to determine the temperature of the solenoid injector 4 when its coil 40 is under power. In this case, the electric generator 3 is connected to the coil 40 of the solenoid injector 4 so as to power it. The current measurement sensor 5, also connected to the coil 40, allows the current flowing through the coil 40 to be measured. The electric generator 3 and the current measurement sensor 5 are both controlled by the computer 2 which retrieves current values from the sensor 5 in order to determine a resistance value of the coil 40 in ohms from which a temperature of the solenoid injector 4 will be determined. Specifically, knowing the voltage delivered by the electric generator 3 and the current in the coil 40 of the solenoid injector 4 measured by the current measurement sensor 5, it is possible to determine the resistance of the coil 40 using Ohm's law.

Thus, in a first step 100, the coil 40 of the solenoid injector 4 is powered by the electric generator 3 for a period of time $t_{voltage}$. This period of time $t_{voltage}$ is strictly shorter than a period of time $t_{lim}$, the latter corresponding to the time for which the coil 40 is under power causing the needle 42 to open. In reality, the triggering of the opening of the needle 42 corresponds to an injection phase of the solenoid injector 4. The method according to the invention makes it possible to determine the temperature of the solenoid injector 4 when the latter is in the non-injection phase, i.e. it is not performing any injection. The coil 40 is thus powered for the period of time $t_{voltage}$ which is necessarily shorter than the period of time $t_{lim}$ under power triggering an injection phase. The computer 2 defines the period of time $t_{voltage}$ for powering the coil 40.

In a second step 110, the current measurement sensor 5 measures at least one coil 40 current value $i_{coil}$ when the coil is under power. According to one embodiment, the at least one current value allowing a temperature of the solenoid injector to be determined is, for example, measured over a period of time strictly shorter than $0.95 \times t_{lim}$. The current measurement sensor 5 thus acquires one or more values of the current $i_{coil}$ at the terminals of the coil 40 over the period of time $t_{voltage}$. This at least one value $i_{coil}$ is also transmitted to the computer 2 and stored in its memory 20. Advantageously, the current measurement sensor 5 performs at least 10 measurements and preferably at least 100 measurements of the current $i_{coil}$ over the period of time $t_{voltage}$.

Lastly, in a last step 120, the computer 2 determines a temperature of the solenoid injector 4 from the at least one current value $i_{coil}$ for the corresponding coil 40 measured in step 110.

Figure 3:
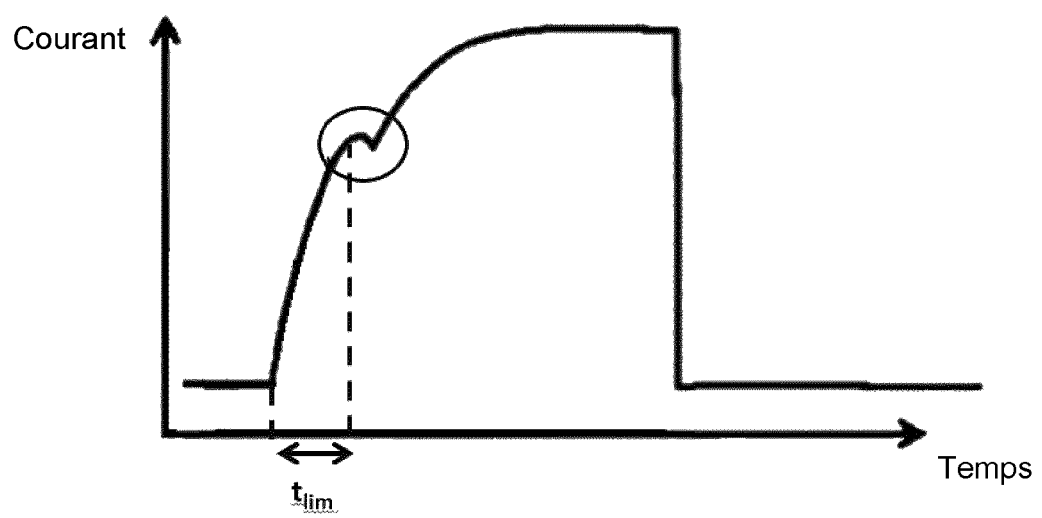
FIG. 3 presents a pattern of the change in the current of a coil of a solenoid injector as a function of time.

The computer 2 also determines the period of time $t_{lim}$ corresponding to the excitation time required for the coil 40 to cause the needle 40 of the solenoid injector 4 to open. It determines the latter based on at least one pattern of the change in the current of the coil 40 of the solenoid injector 4 as a function of time. A pattern corresponds to the change in the current in the coil 40 of the solenoid injector 4 over an injection cycle. One example of this type of pattern is shown in [FIG. 3]. This pattern is constructed using a plurality of current value $i_{coil}$ measurements captured by the current measurement sensor 5 when the solenoid injector 4 is in the injection phase. As shown in [FIG. 3], the period of time $t_{lim}$ is identified on the pattern as the excitation time from which the signal of the current in the coil 40 undergoes a sudden change in variation reflecting the opening of the needle 42 and therefore the start of injection of the substance by the solenoid injector 4. It is understood here that the change profile for the current in the coil 40 of the solenoid injector 4 follows a known theoretical trajectory shared by all of the coils in various systems until the needle 42 opens. Thus, in a solenoid injector, the trajectory of change in the current in the coil follows the theoretical curve for the change in the current in coils independently of the system and then undergoes a sudden change caused by the opening of the needle of the solenoid injector which is therefore specific to the injector system. A computer is capable of identifying this sudden change with respect to the theoretical curve and is thus capable of identifying the time corresponding to the start of injection. The computer 2 is therefore capable of determining the period of time $t_{lim}$. Specifically, since the computer 2 controls the electric generator 3, it therefore knows the start time for powering the coil 40 and it is also capable of determining the time of opening of the needle 42, and it is therefore able to determine the period of time $t_{lim}$.

For example, during an injection phase, the current measurement sensor 5 measures at least 20 values, preferably at least 200 current values $i_{coil}$ at a determined frequency which it sends to the computer 2 in order to create the pattern. Advantageously, the computer 2 associates a time value with each current value $i_{coil}$ sent by the current measurement sensor 5. The computer 2 is then able to identify when the opening of the needle 42 occurs by analyzing the signal of the current $i_{coil}$ in the coil during the injection phase. For example, the computer 2 determines a threshold and, if a difference in current corresponding to the subtraction of two current values measured consecutively $(i_{coil(t+1)} - i_{coil(t)})$ by the current measurement sensor 5 is below said threshold, opening of the needle 42 is detected. In this case, given by way of example, the computer 2 therefore determines that the opening of the needle is between t and $t_{+1}$. In this way, it may choose a period of time $t_{lim}$ equal to t, in which case the period of time $t_{voltage}$ may be chosen so as to be equal to $0.9 \times t_{lim}$, for example.

Alternatively, the period of time $t_{lim}$ may be determined by the computer 2 by identifying a sudden variation in the pressure of the substance to be injected, indicating opening of the needle. Additionally, the period of time $t_{lim}$ is stored in the memory 20 of the computer 2.

It should be noted that the period of time $t_{lim}$ is in particular dependent on the pressure of the substance to be injected (as apparent from the preceding paragraph) as well as on the temperature of the injector. It is thus possible to envisage determining the period of time $t_{lim}$ based on these parameters (and possibly others).

According to a first embodiment, a value of $t_{lim}$ is predetermined by a computer, which may be the one implementing the method for determining the temperature or another one, using at least one current pattern constructed during an injection phase of the solenoid injector 4. This predetermined value of $t_{lim}$ is next stored in the memory 20 of the computer 2 and then used to choose a period of time $t_{voltage}$ when implementing the method for determining the temperature of the solenoid injector 4.

The memory 20 of the computer 2 may also comprise a plurality of values $t_{lim}$ determined from a plurality of current patterns. Each of them may be associated with a temperature value for the solenoid injector and with a pressure value for the substance to be injected in the injection phase. In this way, when implementing the method in the non-injection phase, the computer 2 will choose the value $t_{lim}$ that is the most suitable for the situation in which the injector finds itself according to the temperature and pressure values that it will have measured in the preceding injection phase. It is also possible to construct an empirical function allowing the computer 2 to determine a value for $t_{lim}$ as a function of the pressure values for the substance, the temperatures of the injector in the injection phase and the values for $t_{lim}$ determined previously. Additionally, with each new $t_{lim}$ value determined, it enriches the function.

According to another embodiment, a pattern is advantageously determined in each injection phase of the solenoid injector 4 by the system 1. Therefore, the period of time $t_{lim}$ is updated with each injection cycle of the solenoid injector 4 so as to take into account the change in the various parameters of the injector itself as well as the change in the parameters of the device in which it is embedded. According to this embodiment, the computer 2 chooses the period of time $t_{voltage}$ in such a way that it is strictly shorter than the last period of time $t_{lim}$ determined during the injection phase preceding the implementation of the method.

The method for determining the temperature presented here is particularly suitable for a vehicle whose internal combustion engine is equipped with a selective catalytic reduction (SCR) system having a urea injection system. The urea injection system for implementing the method thus comprises at least one urea solenoid injector, the system also having a computer with a memory, an electric generator, and a current measurement sensor. The computer comprises, in the memory, the steps of the method for determining a temperature of a solenoid injector and is capable of determining a period of time $t_{lim}$ for the at least one urea solenoid injector according to one of the embodiments presented above. It may also receive a period of time $t_{lim}$ predetermined by another computer. The system 1 for determining the temperature presented hereinabove is therefore suitable for an internal combustion engine equipped with an SCR when the solenoid injector 4 is a urea solenoid injector. Additionally, in this embodiment, the determination of the period of time $t_{lim}$ is also dependent on the vehicle's battery voltage. The latter may therefore be associated in the memory with a plurality of $t_{lim}$ values that are predetermined just like the temperature of the injector and the pressure of the substance (here urea). Similarly, in this embodiment, a function also including the battery voltage may be constructed in order to determine a $t_{lim}$ value.

A temperature of a solenoid injector, when the latter is in the non-injection phase, is therefore determined independently of the system in which the solenoid injector is embedded. In addition, the temperature is determined much more easily than in the complex models used in the prior art. Furthermore, the temperature values obtained according to the method presented by the invention are more accurate and are adapted to the change in the parameters of the system and of the solenoid injector.

The invention claimed is:

1. A method for determining a temperature of a solenoid injector including a coil and a needle when the solenoid injector is in a non-injection phase, said method comprising:
   powering the solenoid injector coil using an electric generator for a period of time $t_{voltage}$ strictly shorter than a period of time $t_{lim}$ corresponding to a time for which the coil is under power determined by a computer and causing the needle to open;
   measuring at least one value $i_{coil}$ of the current of the solenoid injector coil using a current measurement sensor when the coil is powered; and
   determining the temperature of the solenoid injector from the at least one value $i_{coil}$ of the current of the solenoid injector coil.

2. The method for determining a temperature as claimed in claim 1, wherein the computer determines the period of time $t_{lim}$ by analyzing the current signal $i_{coil}$ flowing through the coil of the solenoid injector when the injector is in the injection phase.

3. The method for determining a temperature as claimed in claim 1, wherein the period of time $t_{lim}$ is determined by the computer during the injection phase directly preceding the non-injection phase during which the method is implemented.

4. The method for determining a temperature as claimed in claim 1, wherein the at least one current value allowing the temperature of the solenoid injector to be determined is measured over a period of time strictly shorter than $0.95 \times t_{lim}$.

5. A system for determining a temperature of a solenoid injector including a coil and a needle, the system comprising:
   a computer with a memory;
   an electric generator; and
   a current measurement sensor,
   wherein the computer is configured to
   power the solenoid injector coil using an electric generator for a period of time $t_{voltage}$ strictly shorter than a period of time $t_{lim}$ corresponding to a time for which the coil is under power determined by a computer and causing the needle to open,
   measure at least one value $i_{coil}$ of the current of the solenoid injector coil using a current measurement sensor when the coil is powered, and
   determine a temperature of the solenoid injector from the at least one value $i_{coil}$ of the current of the solenoid injector coil.

6. A vehicle comprising:
a selective catalytic reduction system comprising a urea injection device having at least one solenoid injector; and
a temperature determination system for determining a temperature of a solenoid injector including a coil and a needle, the temperature determination system comprising
a computer with a memory,
an electric generator, and
a current measurement sensor,
wherein the computer is configured to
power the solenoid injector coil using an electric generator for a period of time $t_{voltage}$ strictly shorter than a period of time $t_{lim}$ corresponding to a time for which the coil is under power determined by a computer and causing the needle to open,
measure at least one value $i_{coil}$ of the current of the solenoid injector coil using a current measurement sensor when the coil is powered, and
determine a temperature of the solenoid injector from the at least one value $i_{coil}$ of the current of the solenoid injector coil.

7. A non-transitory computer-readable medium on which is stored a computer program including code instructions to implement a method for determining a temperature of a solenoid injector including a coil and a needle when the solenoid injector is in a non-injection phase, when said code instructions are implemented by a computer, the method comprising:

powering the solenoid injector coil using an electric generator for a period of time $t_{voltage}$ strictly shorter than a period of time $t_{lim}$ corresponding to a time for which the coil is under power determined by a computer and causing the needle to open;
measuring at least one value $i_{coil}$ of the current of the solenoid injector coil using a current measurement sensor when the coil is powered; and
determining a temperature of the solenoid injector from the at least one value $i_{coil}$ of the current of the solenoid injector coil.

8. The method for determining a temperature as claimed in claim 2, wherein the period of time $t_{lim}$ is determined by the computer during the injection phase directly preceding the non-injection phase during which the method is implemented.

9. The method for determining a temperature as claimed in claim 2, wherein the at least one current value allowing the temperature of the solenoid injector to be determined is measured over a period of time strictly shorter than $0.95 \times t_{lim}$.

10. The method for determining a temperature as claimed in claim 3, wherein the at least one current value allowing the temperature of the solenoid injector to be determined is measured over a period of time strictly shorter than $0.95 \times t_{lim}$.

11. The method for determining a temperature as claimed in claim 8, wherein the at least one current value allowing the temperature of the solenoid injector to be determined is measured over a period of time strictly shorter than $0.95 \times t_{lim}$.

* * * * *